Figure 1:
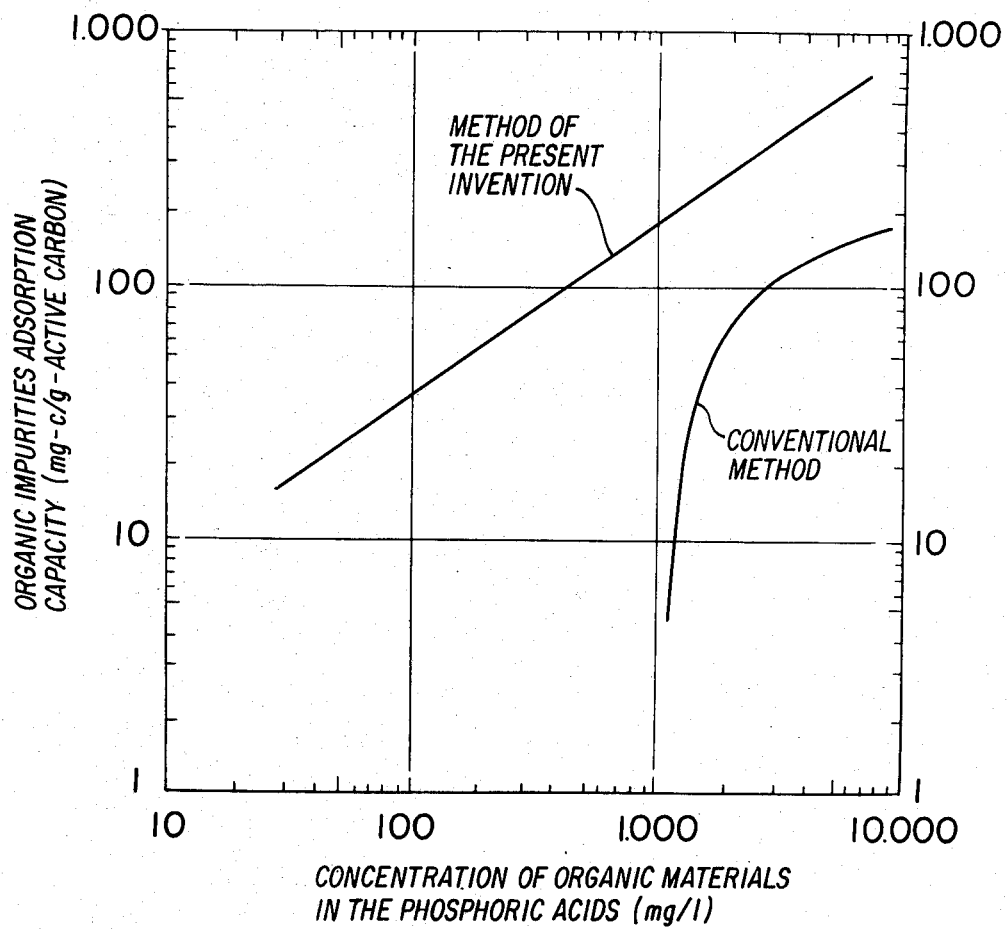

United States Patent [19]

Nakatani et al.

[11] Patent Number: 4,637,922

[45] Date of Patent: Jan. 20, 1987

[54] METHOD FOR REMOVING ORGANIC MATERIALS FROM A WET PROCESS PHOSPHORIC ACID

[75] Inventors: Masaki Nakatani, Tokuyama; Yoichi Hiraga, Shin-nanyo, both of Japan

[73] Assignee: Toyo Soda Manufacturing Co., Ltd., Shin-nanyo, Japan

[21] Appl. No.: 814,298

[22] Filed: Dec. 30, 1985

Related U.S. Application Data

[63] Continuation of Ser. No. 456,096, Jan. 6, 1983, abandoned.

[30] Foreign Application Priority Data

Jan. 18, 1982 [JP] Japan ................................. 57-4829

[51] Int. Cl.$^4$ ............................................. C01B 25/16
[52] U.S. Cl. ................................. 423/321 R; 423/320
[58] Field of Search ................ 423/321 R, 320, 321 S, 423/319

[56] References Cited

FOREIGN PATENT DOCUMENTS

| 1336816 | 7/1963 | France . |
| 1020015 | 2/1966 | United Kingdom ............ 423/321 R |
| 1020015A | 2/1966 | United Kingdom . |
| 1215664 | 12/1970 | United Kingdom . |
| 1303392A | 1/1973 | United Kingdom . |
| 1442919A | 7/1976 | United Kingdom . |

OTHER PUBLICATIONS

European Search Report of French 83 00 635.

Primary Examiner—Gregory A. Heller
Attorney, Agent, or Firm—Oblon, Fisher, Spivak, McClelland & Maier

[57] ABSTRACT

A method for removing organic materials from a wet process phosphoric acid obtained by treating an uncalcined phosphate rock with sulfuric acid. The wet process phosphoric acid is contacted with a reducing material having a standard single electrode potential of at most 1.42 V and then further contacted with active carbon.

2 Claims, 1 Drawing Figure

METHOD FOR REMOVING ORGANIC MATERIALS FROM A WET PROCESS PHOSPHORIC ACID

This application is a continuation of application Ser. No. 456,096, filed Jan. 6, 1983, abandoned.

The present invention relates to a method for removing organic materials from a wet process phosphoric acid obtained by treating an uncalcined phosphate rock with sulfuric acid.

The wet process phosphoric acid contains metallic impurities such as iron, aluminum or calcium, and anionic impurities such as sulfuric acid, fluorine or silica, which are derived from the phosphate rock and sulfuric acid as the raw materials. Further, it usually contains organic materials derived from the phosphate rock, whereby it has a brown or blackish brown color. In recent years, it has been proposed to purify the wet process phosphoric acid by using an organic solvent to obtain highly pure phosphoric acid for industrial or medical use or for use as a food additive. Some of such methods are practically in use on an industrial scale. However, in such industrial methods, very special wet process phosphoric acids are used as raw materials. No practical method is presently available for the purification of a normal wet process phosphoric acid. The reason is that the majority of organic materials contained in the wet process phosphoric acid is extracted into the solvent phase, whereby the separation of the aqueous phase and the solvent phase becomes difficult or the separation speed tends to be extremely slow, or organic materials are likely to precipitate in the extractor, whereby the purification operation becomes to be impossible or extremely difficult, or the product tends to be contaminated with the organic materials. Under these circumstances, it has been desired to develop an effective and economical method for removing the organic materials.

For the removal of the organic materials various methods have been proposed such as an adsorption method using active carbon or a decolorizing resin, a decomposition method using an oxidizing agent or an extraction method using a solvent. However, none of these methods adequately solves the above mentioned difficulties. The reason is that the wet process phosphoric acid contains a substantial amount of non-coloring organic materials. Namely, these method are not very effective for the removal of the non-coloring organic materials and thus it is hardly possible to solve the problems attributable to such organic materials by these methods.

Under the circumstances, there have been proposed methods intended to remove non-coloring organic materials in Japanese Examined Patent Publications No. 16092/1980 and 16093/1980 and U.S. Pat. No. 4,044,108. A common feature of these methods is that the the organic materials are decomposed by using an oxidizing agent at a high temperature. However, since the wet process phosphoric acid is treated at a high temperature in the presence of an oxidizing agent, the materials for the apparatus is inevitably expensive. Further, toxic gases such as $NO_x$, $ClO$ or $ClO_2$ are generated as the decomposition products and accordingly it is necessary to pay due care for the operation and handling. Because of these problems, these methods are not yet practically used.

The present inventors have conducted extensive researches to develop a method whereby all kinds of organic materials can economically and industrially advantageously be removed from a wet process phosphoric acid as the raw material such as an uncalcined Florida phosphate rock which contains an extremely great amount of non-coloring organic materials as compared with phosphate rocks produced in other places. As a result, it has been found that by treating the wet process phosphoric acid with active carbon after treating with a reducing material, it is possible to readily adsorb non-coloring organic materials which have been hardly removed by adsorption by means of active carbon and that it is possible to remarkably improve the amount of adsorption of organic materials per unit active carbon. The present invention has been accomplished on the basis of these discoveries.

Accordingly, it is an object of the present invention to provide a method which is capable of readily and completely remove all kinds of organic materials contained in the wet process phosphoric acid obtained from an uncalcined phosphate rock as the raw material.

The object of the present invention can be attained by a method wherein the above mentioned wet process phosphoric acid is contacted with a reducing material having a standard single electrode potential of at most 1.42 V and then further contacted with active carbon.

Now, the method of the present invention will be described in further detail. The features of the present invention will become apparent from the following detailed description.

The effectiveness of active carbon can be expressed by an adsorptive capacity represented by the following formula.

$$\text{Adsorptive capacity} = \frac{\text{Amount of organic materials adsorbed}}{\text{Amount of active carbon}}$$

In the accompanying drawing, FIG. 1 illustrates a relationship between the concentration of organic materials in the wet process phosphoric acid and the adsorptive capacity. In the FIGURE, "method of the present invention" and "conventional method" represent the results obtained under the same conditions as in Example 1 and Comparative Example 1 except that the amounts of the added active carbon were varied within the range of from 0.06 to 10.0 parts. As is evident from the FIGURE, the amount of adsorption by the active carbon after treating with a reducing material is remarkably increased as compared with the case where no reducing material is present. When no reducing material is present, the concentration of organic materials in the wet process phosphoric acid is 1,100 mg/l as calculated on the basis of the carbon, which indicates that the adsorptive capacity of the active carbon is almost zero, and it is thereby impossible to reduce to concentration of organic materials to a level lower than this concentration. Whereas, in the presence of the reducing material, the removal of the inorganic materials can be done to such an extent that no substantial organic materials remain in the wet process phosphoric acid.

It is not yet clearly understood why the adsorptive capacity of the active carbon for the organic materials is so remarkably improved by the presence of the reducing material. However, it is conceivable that the organic materials in the wet process phosphoric acid are chemically changed by the reducing action into a form which can readily be adsorbed by the active carbon.

Accordingly, it is essential to the present invention to treat the wet process phosphoric acid with a reducing material, followed by treatment with active carbon. It has also been found that no adequate effectiveness is obtainable by a reducing material having a weak reducing ability of a standard single electrode potential of greater than 1.42 V i.e. greater than the standard single electrode potential of hydrazine. Accordingly, it is also essential to the present invention to use a reducing material having a standard single electrode potential of at most 1.42 V.

The standard single electrode potential (Eo) here is based on the data obtained at 25° C. under and acidic condition.

If the reducing material has a standard single electrode potential of at most 1.42 V, the object of the present invention can adequately be achieved. However, a strong reducing material having a standard single electrode potential of less than $-1.0$ V is susceptible to decomposition by an acid and thereby likely to generate hydrogen, whereby the effectiveness tends to be reduced. Accordingly, it is preferable that the reducing material has a standard single electrode potential of from $-1.0$ to 1.42 V.

For example, reducing materials in the invention include metals and semi metals such as boron, chromium, titanium, cobalt, molybdenum, iron, nickel, copper, tin and zinc; low valence compounds of vanadium, manganese, chromium, titanium, cobalt, molybdenum, iron and tin; phosphorous hydride, hypophosphorous acid, phosphorous acid and their salts; and hydrazine and its salts. Further, a calcium salt or a barium salt may also be used, but these compounds are likely to be combined with impurities in the wet process phosphoric acid to form precipitates. Then, pores of the active carbon are likely to be covered or clogged by the precipitates. Accordingly, it is necessary to remove the precipitates before the treatment with active carbon.

In view of the economy, availability and easiness in handling, particularly preferred reducing materials are iron such as powdery iron or reduced iron, powdery tin, hypophosphorous acid and hydrazine. These materials may be used alone or in combination as a mixture. The amount of the reducing material to be used may vary depending upon the amount of the organic materials contained in the wet process phosphoric acid. However, it is usually in an amount of at least 0.05 equivalent (reducing equivalent) per liter of the wet process phosphoric acid. To ensure the effectiveness, the reducing material is used in an amount of at least 0.1 equivalent per liter of the wet process phosphoric acid.

The manner of contacting the wet process phosphoric acid with the reducing material is not critical. Usually, the reducing material is added to and reacted with the wet process phosphoric acid and then active carbon is contacted therewith. In some cases, it is preferred to conduct the reaction at a slightly elevated temperature depending upon the nature of the reducing material used. For instance, when iron or hydrazine is used, the reaction can be completed in an hour at room temperature. Whereas, when tin or hypophosphorous acid is used, it is necessary to conduct the reaction at a temperature of about 70° C. for about 2 hours.

The method of the present invention is applicable to the treatment of a wet process phosphoric acid obtained from an uncalcined phosphate rock in general, but it is particularly suitable for the treatment of a wet process phosphoric acid obtained from Florida phosphate rock. Namely, when the method of the present invention is applied to the treatment of a wet process phosphoric acid obtained from an uncalcined Moroccan phosphate rock, the effectiveness is relatively small, and in some cases adverse effects are likely to be brought as described hereinafter with reference to Comparative Examples 3 and 4. It is believed that this is attributable to the fact that the compositions and structures of the organic materials contained in the Florida phosphate rock are totally different from those of Moroccan phosphate rock.

The method of the present invention can be applied to the treatment of any wet process phosphoric acid so long as the wet process phosphoric acid is obtained from an uncalcined Florida phosphate rock. Namely, it is applicable not only to the filter acid but also to any phosphoric acid solution such as a concentrated acid, a difluorinated acid or a desulfurized acid. It is also applicable to an extracted phosphoric acid obtained by extraction purification.

According to the method of the present invention, organic materials which are usually contained in an amount of from 3,000 to 4,000 ppm as carbon in e.g. an uncalcined Florida phosphate rock, can be reduced to a level of at most 100 ppm as carbon which is equivalent to the level in the wet process phosphoric acid obtained from a calcined phosphate rock. Thus, the phosphoric acid thereby obtained can be treated by a usual purification process without any troubles to obtain highly pure phosphoric acid.

The active carbon and the manner of its use according to the present invention are not critical. A commercially available powdery carbon, pulverized carbon or granular carbon may be used. The contacting method may be optionally selected from a batch method and a continous method.

The method of the present invention is industrially very useful and has the following advantages.

(1) The method can be conducted at a temperature around room temperature, and no special apparatus is required. The method is extremely economical with low energy consumption.

(2) There is no production of corrosive or toxic gas, and a process is quite safe.

(3) The adsorption method using active carbon is quite common and established means, and the production efficiency is thereby quite high.

(4) The method is applicable to a wet process phosphoric acid obtained from an uncalcined Florida phosphate rock which is the most popular raw material. Further, the treated phosphoric acid can readily be purified by a common purification method without any problem.

Now, the present invention will be described with reference to Examples. In the Example, "%" and "parts" means "% by weight" and "parts by weight", respectively. The content of organic materials is represented by the carbon content.

EXAMPLE 1 and COMPARATIVE EXAMPLES 1 and 2

A concentrated wet process phosphoric acid obtained by treating an uncalcined Florida phosphate rock (BPL—Bone Phosphate of Lime—77) with sulfuric acid, had the following composition.

| $P_2O_5$ | 54.3% |

| | |
|---|---|
| SO$_4$ | 4.5% |
| Fe | 1.2% |
| Organic materials (as carbon) | 3,200 ppm |

Into a reactor equipped with a stirrer, 100 parts of the above wet process phosphoric acid was introduced and 1.0 part of powdered iron (Eo = −0.44 V) was added as reducing material. The reaction was conducted for one hour at 20° C. under stirring. After the reaction, 6.0 parts of powdery active carbon (trade name UMEBA-CHI manufactured by TAIHEI Chemical Industries Co., Ltd.) was added and the mixture was stirred at 40° C. for 3 hours. The slurry thereby obtained was filtered, and the content of organic materials in the filtrate was measured. The result obtained is shown in Table 1.

An experiment was conducted in the same manner and conditions as in the above Example 1 except that no reducing material was added to the wet process phosphoric acid. The result thereby obtained is shown as Comparative Example 1 in Table 1.

A further Experiment was conducted in the same manner and conditions as in Example 1 except that no active carbon was added. The results thereby obtained is shown as Comparative Example 2 in Table 1.

TABLE 1

| | Contents of organic materials in the treated wet process phosphoric acid |
|---|---|
| Example 1 | 83 ppm |
| Comparative Example 1 | 1,040 ppm |
| Comparative Example 2 | 3,230 ppm |

COMPARATIVE EXAMPLES 3 and 4

A wet process phosphoric acid obtained from an uncalcined Moroccan phosphate rock (BPL 70) had the following composition.

| | |
|---|---|
| P$_2$O$_5$ | 47.6% |
| SO$_4$ | 2.5% |
| Fe | 0.2% |
| Organic materials (as carbon) | 350 ppm |

Experiments were conducted in the same manner as in Example 1 except that 0.25 part of active carbon was added to 100 parts of the above wet process phosphoric acid (Comparative Example 3), and no reducing material was added (Comparative Example 4), whereby the concentrations of organic materials in the phosphoric acid were 115 ppm and 48 ppm, respectively. Thus, it has been found that the effectiveness of the active carbon was reduced by the presence of the reducing material.

EXAMPLES 2, 3 and 4

Sodium hydroxide and a phosphate rock were added to and reacted with the wet process phosphoric acid used in Example 1, and the formed precipitates were removed. The phosphoric acid solution thereby obtained had the following composition.

| | |
|---|---|
| P$_2$O$_5$ | 50.5% |
| SO$_4$ | 0.12% |
| Si | 0.05% |
| Fe | 1.10% |
| Organic materials (as carbon) | 2,680 ppm |

Experiments were conducted in the same manner as in Example 1 except that hydrazine (Eo = 1.42 V), powdered tin (Eo = −0.14 V) and hypophosphorous acid (Eo = −0.50 V) were respectively added to 100 parts of the above wet process phosphoric acid in an amount of 1.2 parts as reducing material. The contents of organic materials in the treated phosphoric acids were 108 ppm, 113 ppm and 97 ppm, respectively.

COMPARATIVE EXAMPLE 5

An experiment was conducted in the same manner as in Example 2 except that manganese dioxide (Eo = 1.69 V) was used as reducing material. The content of organic materials contained in the treated wet process phosphoric acid was 1,020 ppm.

EXAMPLE 5

A wet process phosphoric acid obtained from an uncalcined Fluoride phosphate rock (BPL 75), had the following composition.

| | |
|---|---|
| P$_2$O$_5$ | 34.8% |
| SO$_4$ | 2.0% |
| Fe | 0.7% |
| Organic materials (as carbon) | 1,860 ppm |

To 100 parts of the above wet phosphoric acid, 1.0 part of reduced iron was added and the reaction was conducted at 20° C. for 1 hour under stirring. After the reaction, the reaction solution was passed through a column of a glass tower having an inner a diameter of 20 mm and height of 800 mm, equipped with the jacket, packed with granular active carbon (trade name CAL, manufactured by CALGON Co.) and held at a temperature of 40° C. at a space velocity of 0.1 Hr$^{-1}$.

The content of organic materials in the wet process phosphoric acid recovered from the bottom of the tower was 24 ppm.

EXAMPLE 6

A wet process phosphoric acid obtained from an uncalcined Florida phosphate rock (BPL 68), had the following composition.

| | |
|---|---|
| P$_2$O$_5$ | 52.0% |
| SO$_4$ | 1.25% |
| Fe | 0.84% |
| Organic materials (as carbon) | 2,580 ppm |

In a reactor equipped with a stirrer, 100 parts of the above wet process phosphoric acid was introduced, and 1.6 parts of hypophosphorous acid was continuously added to the reactor at 80° C. The reaction was conducted for a retention time of 2 hours. After the reaction, the reaction mixture was passed through the same column as in Example 5 packed with granular active carbon (trade name GLC, manufactured by TAIHEI Chemical Industries Co., Ltd.) at a temperature of 80° C. and at a space velocity of 0.1 Hr$^{-1}$.

The content of organic materials in the recovered wet process phosphoric acid was 80 ppm.

We claim:

1. A method for removing non-coloring organic materials from a wet process phosphoric acid obtained by treating an uncalcined Florida phosphate rock with sulfuric acid, comprising:

(i) contacting wet process phosphoric acid with at least one reducing material selected from the group consisting of chromium, nickel, copper, iron, tin, hypophosphorous acid, its salts and hydrazine; and then (ii) further contacting said phosphoric acid contacted with a reducing material in step (i), with active carbon in the absence of a solid phase.

2. The method according to claim 1, wherein the wet process phosphoric acid is contacted with 0.05 equivalent of the reducing material per liter of the wet process phosphoric acid in the first step.